United States Patent [19]
Lai et al.

[11] Patent Number: 5,995,644
[45] Date of Patent: Nov. 30, 1999

[54] ROBUST AND AUTOMATIC ADJUSTMENT OF DISPLAY WINDOW WIDTH AND CENTER FOR MR IMAGES

[75] Inventors: Shang-Hong Lai, Plainsboro; Ming Fang, Cranbury, both of N.J.

[73] Assignee: Siemens Corporate Research, Inc., Princeton, N.J.

[21] Appl. No.: 08/885,080

[22] Filed: Jun. 30, 1997

[51] Int. Cl.$^6$ ...................................................... G06K 9/00
[52] U.S. Cl. .......................... 382/131; 382/156; 382/169
[58] Field of Search .................................... 382/168, 132, 382/261, 239, 274, 131, 156, 169

[56] References Cited

U.S. PATENT DOCUMENTS 5,305,204 4/1994 Ohhashi .............................. 364/413.13
5,825,936 10/1998 Clarke et al. ............................ 382/261
5,835,618 11/1998 Fang et al. ............................... 382/261

*Primary Examiner*—Andrew W. Johns
*Attorney, Agent, or Firm*—Donald B. Paschburg

[57] ABSTRACT

A system for deriving final display parameters for a wide range of MR images consists of a feature generator utilizing both histogram and spatial information computed from an input MR image, a wavelet transform within the feature generator for compressing the size of the feature vector, a competitive layer based neural network for clustering MR images into different subclasses, a bi-modal linear estimation network and a radial bases function network based non-linear estimator for each subclass, as well as a data fusion system using estimates from both estimators to compute the final display parameters.

21 Claims, 10 Drawing Sheets

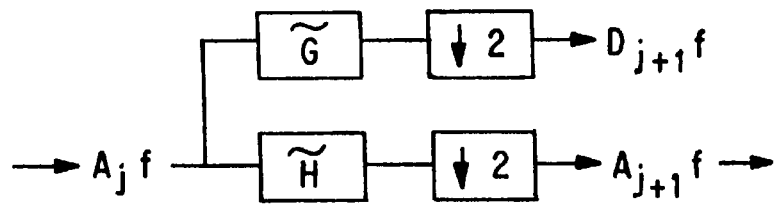
FIG. 3a
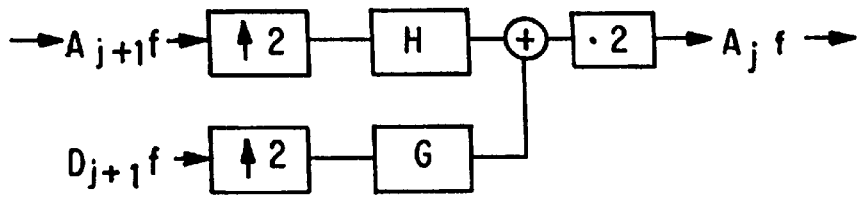
FIG. 3b
FIG. 5

$$M_w^{(i)} = \begin{cases} \min(\cos)\left[\left(\frac{\hat{w}_i - K_{w0w0}^{(i)}}{K_{w0w0}^{(i)}} \cdot \frac{\pi}{2}\right), \cos\left(\frac{\hat{w}_i - K_{w1w0}^{(i)}}{K_{w1w0}^{(i)}} \cdot \frac{\pi}{2}\right)\right] & \min\left(\frac{\hat{w}_i - K_{w0w0}^{(i)}}{K_{w0w0}^{(i)}}, \frac{\hat{w}_i - K_{w1w0}^{(i)}}{K_{w1w0}^{(i)}}\right) < \alpha \\ 0 & \min\left(\frac{\hat{w}_i - K_{w0w0}^{(i)}}{K_{w0w0}^{(i)}}, \frac{\hat{w}_i - K_{w1w0}^{(i)}}{K_{w1w0}^{(i)}}\right) \geq \alpha \end{cases}$$

$$M_c^{(i)} = \begin{cases} \min(\cos)\left[\left(\frac{\hat{c}_i - K_{c0c0}^{(i)}}{K_{c0c0}^{(i)}} \cdot \frac{\pi}{2}\right), \cos\left(\frac{\hat{c}_i - K_{c1c0}^{(i)}}{K_{c1c0}^{(i)}} \cdot \frac{\pi}{2}\right)\right] & \min\left(\frac{\hat{c}_i - K_{c0c0}^{(i)}}{K_{c0c0}^{(i)}}, \frac{\hat{c}_i - K_{c1c0}^{(i)}}{K_{c1c0}^{(i)}}\right) < \alpha \\ 0 & \min\left(\frac{\hat{c}_i - K_{c0c0}^{(i)}}{K_{c0c0}^{(i)}}, \frac{\hat{c}_i - K_{c1c0}^{(i)}}{K_{c1c0}^{(i)}}\right) \geq \alpha \end{cases}$$

FIG. 10

ROBUST AND AUTOMATIC ADJUSTMENT OF DISPLAY WINDOW WIDTH AND CENTER FOR MR IMAGES

BACKGROUND OF THE INVENTION

1. Field of the Invention

The present invention relates to displaying magnetic resonance images and more particularly to linearly re-mapping the image intensity range of magnetic resonance images.

2. Description of the Prior Art

Magnetic Resonance (MR) images have typically a data depth of 12 bits. For displaying any 12-bit MR image on a common 8-bit computer monitor, the image intensity range of the MR image needs to be re-mapped in general. One of the common prior art re-mapping processes is the so-called windowing process. It maps the image intensity values linearly from [(center—width)/2, (center+width)/2] to [0, 255], where center and width are two display parameters to be adjusted. The image intensity values below [(center—width)/2] are mapped to zero, while they are set to 255 if greater than [(center+width)/2]. Obviously, these two parameters can greatly influence the appearance of the image displayed. In other words, the brightness and the contrast of an image is determined by these two parameters. Inadequate adjustment of these parameters can lead to degradation of image quality and in severe cases to loss of valuable diagnostic information of the images.

Automatic adjustment of the above-mentioned two display parameters is in fact a very complicated problem because of the following reasons:

The maximum and the minimum pixel intensity value are instable quantities for the automatic adjustment of display parameters. They can be influenced strongly by many factors, such as spikes and background noise. This makes any system that uses the maximum and minimum values of the image intensity instable.

The region of interest in the intensity domain may only occupy a small portion of the dynamic range of the image pixel values. It is therefore inadequate to map the entire dynamic range of an image to [0, 255].

The spatial distribution of an image may also play an important role in the adjustment of the display window parameters. Different organs may have similar intensity distribution (histograms) but should be windowed differently. This factor makes the use of other information sources beyond the histogram of MR images necessary. Unfortunately, all current algorithms known to us are based on histograms or its derivatives.

It is also evident that the optimal display parameters also depend on the type of MR examinations. Different types of MR images may need to be viewed, and hence windowed differently. For example, 3D angiographic images, T1 or T2 weighted images, and inversion recovery images should be windowed very differently.

In general, images acquired with body or surfaces coils have to be treated differently. Surface coil images tend to have much larger dynamic range than the body coil images.

Individuals may have very different preferences in terms of image brightness and contrast. Some testing results have shown significant differences in adjusting the image appearance among different users or user groups. There is also evidence indicating that large differences in adjusting the same image may even occur for the same individual at a different time.

The optimal display window parameter setting is environmental condition dependent. Different lighting conditions, for example, may influence the adjustment results greatly.

The optimal display parameters are also monitor dependent. Different monitor settings, such as the gamma curve, the brightness and the contrast control values, may also affect the window width and center parameters strongly. There may be even large difference between aged and new monitors.

There have been some prior art methods developed for the automatic adjustment of a display window's width and center values. The most basic method is to determine the maximal and the minimal intensity values of each MR image, and then map them to [0, 255] in a linear fashion. This method does not work well in many cases because it does not solve any of the problems mentioned above.

The weaknesses of this basic method can be overcome partially by a more robust histogram based method as proposed by W. J. Ryan, R. T. Avula, B. J. Erickson, J. P. Felmlee and N. J. Hanglandreou in "Automatic Window Width And Window Level Calculation For MR Images", Proceeding of Radiological Society of North America, pp.447, 1995. In this method, after the histogram of an image has been computed, all of the histogram bins with less than a certain number of pixels are removed for further calculation. This step is used to reduce the influence of bad pixels (outliers in the statistical sense), such as spikes and background noisy pixels. However, this method still can not provide satisfactory solutions for a wide range of MR images because it completely relies on the histogram information to determine the display parameters, which is not sufficient for the adjustment of the display window width and center for a wide variety of MR images. Through test data, many cases have been found where human operators have selected a very different setting of the display parameters for some images with very similar histograms, but with different spatial distributions. This problem will be discussed in more detail in the Detailed Description of the Invention. It is an object of the present invention to resolve this ambiguity for using histogram information only, by utilizing some spatial statistical information of the images in addition to the histogram information for the display window parameters determination. The performance and robustness of such a system would be greatly improved with the addition of spatial statistical information.

R. E. Wendt III in "Automatic Adjustment Of Contrast And Brightness Of Magnetic Resonance Images", Journal of Digital Imaging, Vol. 7, No. 2, pp. 95–97, 1994, has proposed a system which determines at first the type of an MR image by reading the image header information, and then computes the display parameters depending on the type of the image. This provides a possibility to determine the actual field of view of the image to avoid pixels lying on the edge and outside of the field of view. It also ignores pixels that have values below a threshold, depending on the type of image being processed. However, this system requires that different rules must be set for different types and orientations of MR images. This makes the system somewhat impractical, since the software may have to be re-programmed to reflect any new changes in the MR image acquiring process, such as the use of new coils or new pulse sequences. It is therefore very desirable to have some adaptation capability built-in so that the system can adapt to these new coils or sequences without the re-programming of the software. An obvious possibility is to use neural networks which provide "learn by example" capability. By showing the new examples, the neural networks can be re-trained without re-programming.

There is also a neural network based method developed for the automatic adjustment described by A. Ohhashi, S. Yamada, K. Haruki, H. Hatano, Y. Fujii, K. Yamaguchi and H. Ogata in "Automatic Adjustment Of Display Window For MR Images Using A Neural Network", Proceeding of SPIE, Vol. 1444, Image Capture, Formatting and Display, pp. 63–74, 1991. A group of six features from the gray-level histogram of the MR images to be displayed is at first extracted. A back-propagation neural network is then trained to learn the relationship between these features and the desired output of the optimal display parameters set by human operators. Although this method has some advantages by utilizing a neural network over the above two methods, it is still a pure histogram based method since the features for the training is generated only from the histogram. As mentioned above, pure histogram based methods will not be able to solve the potential problem for the images with different spatial distributions but very similar histograms. In addition, pure neural network based methods in general have problems when an input image type has not been trained before. Since MRI can generate a large amount of different image types with different pulse sequences and different TR, TE, TI parameters, it presents a great challenge for any pure neural network based method to cover all possible cases in the training phase. Furthermore, this method uses only one neural network to learn the relationship between histogram based features and the desired output of the optimal display parameters. However, in practice, one neural network in many cases is often not enough for capturing the very complex, sometimes even totally conflicting, relationship. There is an obvious need for using more networks to minimize the probability of conflicting situations. The problem becomes "how can multiple networks be organized and utilized in a meaningful way?" and "what kind of means can be used as a safety net if a totally unknown image is given to be windowed?".

It is an object of the present invention to address all of the issues mentioned above through the development of a comprehensive neural networks based system. Such a system, unlike other prior art systems, should be designed with easy extensions for on-line adaptation capability, thus it should be developed as an adaptive system.

SUMMARY OF THE INVENTION

The present invention provides a system for the automatic adjustment of display window width and center for a wide range of MR images. The system consists of a feature generator utilizing both histogram and spatial information computed from an input MR image, a wavelet transform within the feature generator for compressing the size of the feature vector, a classifier for clustering MR images into different subclasses, a bi-modal linear estimator and a radial bases function network based non-linear estimator for each subclass, as well as a data fusion system using estimates from both estimators to compute the final display parameters.

Both estimators can adapt to new kinds of MR images simply by training them with those images, which makes the present invention adaptive and extendable. This trainability also makes possible advanced future developments such as adaptation of the display parameters to a user's personal preference. While the non-linear neural network based estimator performs very well for images which are similar to those in the training data set, the linear estimator provides reasonable estimations for a wide range of images, which may not be included in the training data set. The data fusion makes the final estimation of the display parameters accurate for trained images and robust for the unknown images.

BRIEF DESCRIPTION OF THE DRAWINGS

FIG. 3 illustrates the implementation of the wavelet transform via the QMF structure from one level to the next with FIG. 3(a) showing decomposition and FIG. 3(b) showing reconstruction, adopted from S. G. Mallat, "A Theory Of Multiresolution Signal Decomposition", IEEE Trans. Pattern Anal. Machine Intell., Vol. 11, No. 7, pp. 647–693, 1989.

FIG. 5 illustrates mean and standard deviations combined to be the spatial statistical features.

FIG. 10 illustrates the consistency measures $M_w^{(i)}$ and $M_c^{(i)}$ for width and center estimates in the i-th cluster respectively.

DETAILED DESCRIPTION OF THE INVENTION

Figure 1:
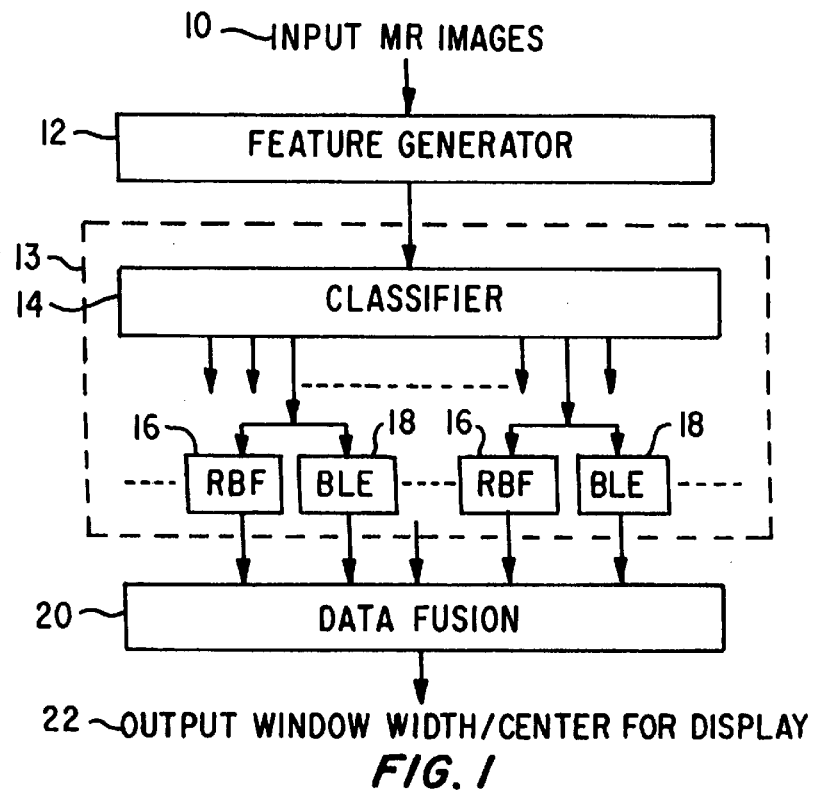
FIG. 1 illustrates a block diagram of one embodiment of the present invention.

The following will describe a system overview of the neural network based system of the present invention. FIG. 1 illustrates a block diagram of one embodiment of the present invention. For explanation purposes, ninety clusters (classes) will be used for dealing with a wide range of MR image types. For any input image, eight classes with the highest confidence scores from the competitive layer neural network will be used for the estimation. A data fusion system is utilized for providing the final robust estimations of the optimal display window parameters.

The present invention includes feature generator 12 that uses both histogram and spatial intensity distributions of input MR images 10. This resolves, in most cases, the conflicting situations where the window display settings are very different although the histograms of the images are very similar. Since MR images have a data depth of twelve bits, the size of the image histogram could be large. It is therefore necessary to compress the histogram information into a much smaller size, such as sixteen elements for efficient training of neural networks. Both wavelet transform and principal component analysis (PCA) methods have been implemented for obtaining a compact representation of useful information from the MR images. Since the experiments did not show any significant performance difference between both methods and PCA is more computationally expensive, it has been decided to use the wavelet transform for one embodiment of the invention. For distinguishing different types of MR images, hierarchical neural networks 13 are used. Hierarchical neural networks 13 include classifier 14, Radial Bases Function (RBF) networks 16 and Bimodal Linear Estimation (BLE) networks 18. Classifier 14 is a competitive layer neural network that clusters any input image into a certain number of clusters. Ninety different clusters (classes) have been used in the current explanation for covering a wide range of different types of MR images. Furthermore, two totally different and independent estimation methods are used for each class for achieving good performance. Radial bases function networks 16 are used for providing accurate estimation for known (trained) MR image types, while bimodal linear estimation networks 18 provide robust and reasonable estimation for a wide range of images, that may not be included in the training data set. Finally, data fusion system 20 is implemented for making the overall system accurate for trained images and robust for the unknown images. The output of data fusion system 20 is output window width and center for display 22.

For fast execution and training, a wavelet transformation within feature generation 12 is utilized to compress the histogram of MR images 10 (usually with 4096 bins) to a much smaller size, say sixteen elements, of the feature vector so that the neural networks can be executed and trained efficiently. In the next several sections, all of the components of the present invention will be described in more detail.

The following will describe the representative features extracted from input MR images 10 used for the estimation of display window width and center, i.e. these features will be fed into the neural networks for window width/center estimation. The chosen features must be decisive for the adjustment of the display window width and center. The features used in the present invention consist of histogram features and spatial statistical features. The following describes how these two different types of features are extracted from the image.

Figure 2:
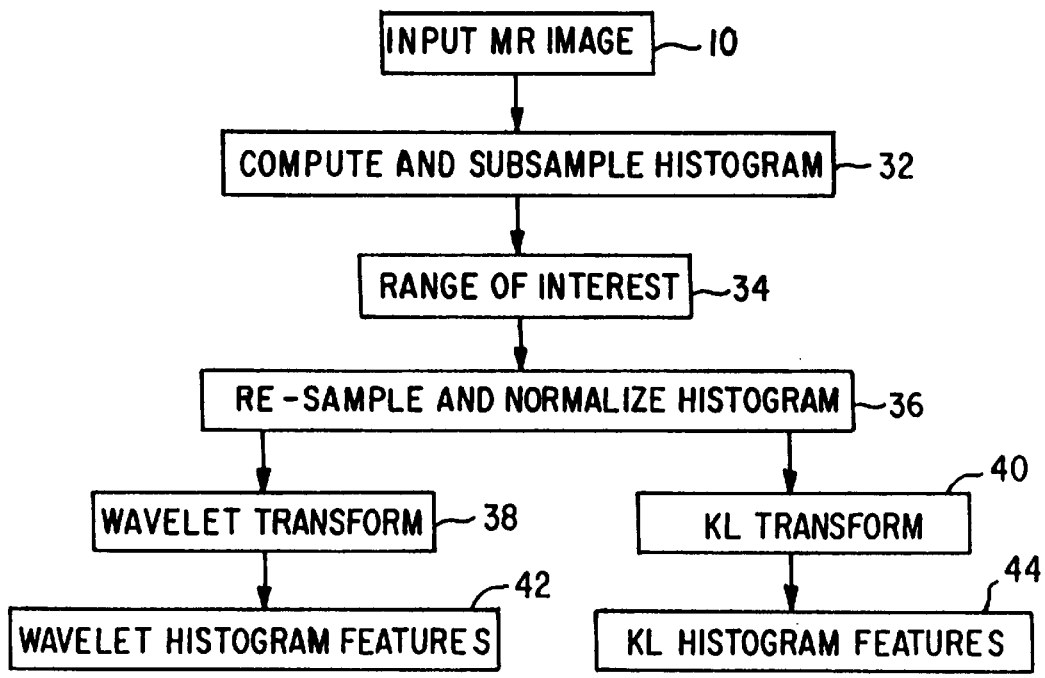
FIG. 2 illustrates a flow chart of the wavelet histogram feature extraction process.

Histogram information is very important for the determination of the display window width and center for an MR image. Several methods have been proposed previously to automatically adjust the window width and center for an image from its histogram. In the present invention, the histogram features are extracted from the histogram of an image as follows. The flow of the wavelet histogram or the Karhunen-Loeve histogram feature extraction process is illustrated in FIG. 2. At first, the histogram is computed and subsampled in compute and subsample histogram 32 from the input image 10 and a range of interest is obtained from it in range of interest 34. The histogram is then smoothed and re-sampled using a pre-determined number of bins in re-sample and normalize histogram 36. Finally, the wavelet transform 38 or the Karhunen-Loeve transform (KL transform) 40 of the new re-sampled histogram is computed and only the coefficients corresponding to the coarsest level as the wavelet histogram features 42 or KL histogram features 44 are taken.

Note that the determination of the range of interest from the subsampled histogram involves two steps. The first step is to find the background thresholding value from the histogram and set the portion of the histogram that is below this value to zero. The second step is to compute the mean $\mu$ and standard deviation $\sigma$ of the image from the new histogram obtained from the first step. Then, the range of interest is taken as the interval between max($\mu$-3$\sigma$, 0) and min($\mu$+3$\sigma$, Imax). The interval [$\mu$-3$\sigma$, $\mu$+3$\sigma$] is chosen based on the fact that for a Gaussian distribution 99.73% of samples are inside this interval. Since the pixel values are always inside the interval [0, Imax], the intersection between these two intervals is taken to be the range of interest. How to decide the background thresholding value will be described below.

To compute the background thresholding value, the subsampled histogram is smoothed by using smoothing spline. Then the local minimum point less than a default largest background threshold (set to be 100) of the smoothed subsampled histogram and with the strongest positive response to the Laplacian operator, i.e. second-order differential operator, is found. This local minimum point is chosen to be the background threshold of the image.

After the range of interest is determined in range of interest 34, the histogram in this interval is re-sampled using fixed n bins and the re-sampled n-dimensional vector is normalized by its Euclidean norm. This occurs in re-sample and normalize histogram 36. Then, the wavelet transform 38 or the KL transform 40 of the above normalized vector is taken and the coefficients corresponding to the most representative bases is used to be the histogram features 42, 44. For wavelet transform 38, the wavelet bases in the coarsest level are chosen. As for KL transform 40, the most dominant principal components are the most representative bases. The following describes wavelet transform 38 and KL transform 40 for completeness.

Wavelet transform has been used widely in the signal and image processing communities since it provides a powerful tool for multi-resolution analysis. This is described by S. G. Mallat in "A Theory Of Multiresolution Signal Decomposition", IEEE Trans. Pattern Anal. Machine Intell., Vol. 11, No. 7, pp. 647–693, 1989. The construction of a wavelet basis is achieved by defining a scaling function $\phi$, such that the integer translates of the dilated scaling function $\sqrt{2^{-j}}\phi(2^{-j}X)$ form an orthonormal basis of $L^2(R)$, where j is an integer. This orthonormal bases $(=\{\sqrt{2^{-j}}\phi(2^{-j}x-k)\}_{k \in Z})$ forms a subspace $V_j \subset L^2(R)$, and the subspaces $V_j$ satisfy the containment hierarchy $V_j \subset V_{j-1}$ for all j.

Now, the difference space $W_j$ between the two consecutive subspaces $V_j$ and $V_{j-1}$ such that $V_j \oplus W_j = V_{j-1}$, where $\oplus$ denotes the direct sum operator can be introduced. The key idea of the wavelet basis is that the difference space $W_j$ is spanned by an orthonormal basis which are obtained via integer translations of the associated wavelet function $\phi(x)$, i.e. $W_j = \{\sqrt{2^{-j}}\phi(2^{-j}x-k)\}_{k \in Z}$. Therefore, a multi-resolution orthogonal decomposition of the space $V_0$ can be achieved via $$V_J \oplus W_J \oplus W_{J-1} \oplus \ldots \oplus W_1 = V_0$$

where J is a positive integer. From this multi-resolution orthogonal space decomposition, a multi-resolution orthonormal wavelet basis can be constructed, since each of the subspaces on the left hand side of the above equation are orthogonal to each other and there exists an orthonormal basis for each subspace as discussed above.

The wavelet decomposition and reconstruction can be efficiently achieved via a Quadrature Mirror Filters (QMF) implementation as shown in FIG. 3. In this figure, $A_j f$ is the discrete approximation of the function $f$ in the subspace $V_j$, i.e. $A_j f$ contains the values of the inner products of the function $f$ and the orthonormal basis functions in $V_j$, and $D_j f$ encodes the projection of the function $f$ on the subspace $W_j$. The filters $\tilde{H}$ (in decomposition) and H (in reconstruction) are low-pass filters, while the filters $\tilde{G}$ (in decomposition) and G (in reconstruction) are high-pass filters. They are usually designed to be the FIR filters, which can be implemented via convolution operations. With an appropriate choice of a wavelet basis, the associated finite impulse response (FIR) filters with very short length/span can be found and the QMF filter implementation for the wavelet transform can be accomplished very efficiently.

FIG. 3 illustrates the implementation of the wavelet transform via the QMF structure from one level to the next. FIG. 3(a) shows decomposition while FIG. 3(b) shows reconstruction. FIG. 3 is adopted from S. G. Mallat, "A Theory Of Multiresolution Signal Decomposition", IEEE Trans. Pattern Anal. Machine Intell., Vol. 11, No. 7, pp. 647–693, 1989.

The QMF structure decomposes the space from one level to the next coarser level with each stage involving a low-pass and high-pass filtering. In the implementation of the present invention, an orthogonal wavelet transform is used, which means the low-pass filter H is the same as $\tilde{H}$ and the high-pass filter G is the same as $\tilde{G}$. These filters are implemented by FIR filters of coefficients {−0.0761025, 0.3535534, 0.8593118, 0.3535534, −0.0761025} and coefficients {−0.0761025, −0.3535534, 0.8593118, −0.3535534, −0.0761025} for H and G, respectively. In the implementation of the present invention, the histogram is preprocessed and subsampled to a vector of size 64. Then, the wavelet decomposition of three levels are performed on the vector. The eight coefficients corresponding to the coarsest level are used as the wavelet histogram features.

The Karhunen-Loeve transform (KL transform), also commonly referred to as the principal component analysis (PCA), is very efficient in data compression. It is described by R. C. Gonzalez and P. Wintz in "Digital Image Processing", 2nd Ed., Addison-Wesley Pub., 1987. It is based on the statistical analysis of the input data set to construct a set of orthogonal bases, i.e. the principal components, associated with the eigenvalues meaning the average magnitude of all the input data along these principal components. Since these principal components are orthogonal, they are uncorrelated from a statistical perspective. By ordering the associated eigenvalues, the most dominant principal components to represent the input vector compactly can be found. In the implementation of the present invention, usually eight most dominant principal components are used for the projection of the preprocessed histogram vector.

To find the principal components and the associated eigenvalues from the data set, it is necessary to perform a principal component analysis on the data set. The $N_d$ data vectors for the PCA procedure shall be denoted by $\{v_1, v_2, \ldots v_{N_d}\}$, where each $v_i$ is a n-dimensional vector for $i=1, \ldots, N_d$. A correlation matrix C of these vectors is defined as $$C = (1/N_d) \sum_{i=1}^{N_d} v_i v_i^T$$

Since the matrix C is symmetric positive definite as described by G. H. Golub and C. F. Van Loan in "Matrix Computations", The John Hopkins University Press, 2nd Ed., 1989, a set of orthogonal eigenvectors with associated positive eigenvalues for this matrix can be found from its singular value decomposition. The principal components of the data set are the same as the eigenvectors of the correlation matrix C.

The above is the procedure for finding the wavelet or KL histogram features to be used as part of the input vector to the competitive layer clustering network and the Radial Basis Function (RBF) estimation networks. In addition to the wavelet histogram features, the window width and center reference values are computed for the display window from the histogram as input to the bi-modal linear networks, which will be explained later. To compute the window width and center reference values, each component of the original histogram vector is thresholded by an appropriately chosen value. Then, the reference window center is set to be a mean gray level with the thresholded histogram vector as the weighting, and the reference window width is chosen to be the number of non-zero entries in the thresholded histogram vector. These window width and center reference values will be fed into the width and center bi-modal linear networks, respectively. The window width and center reference values are denoted by $w_0$ and $c_0$, respectively.

Figure 4A:
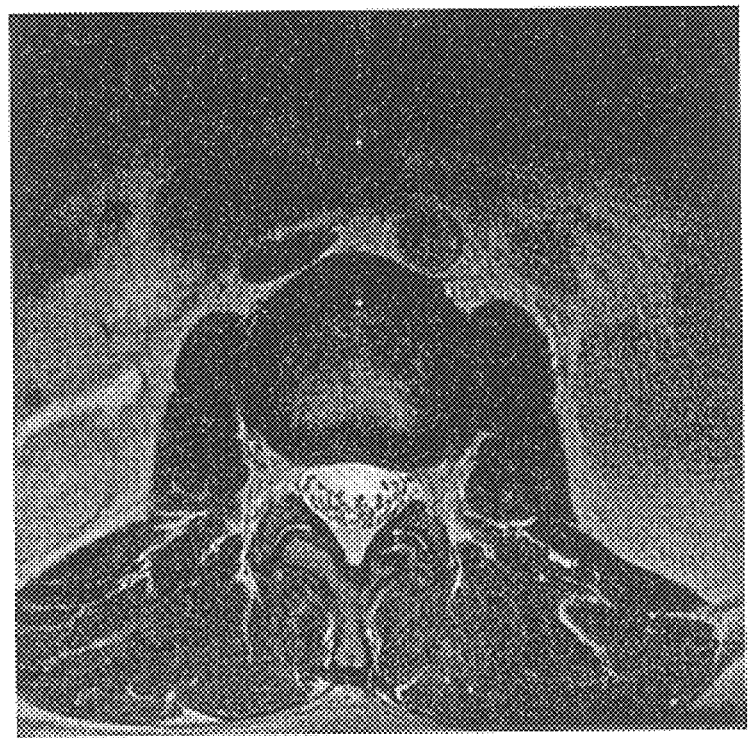
FIG. 4 illustrates two completely different MR images shown in FIG. 4(a) and FIG. 4(b) with very similar histograms but very different window width/center settings as shown in FIG. 4(c). Their wavelet histogram feature vectors are still very similar as shown in FIG. 4(d). With the inclusion of the spatial statistical features, the complete feature vectors become much more distinct as shown in FIG. 4(e).
Figure 4B:
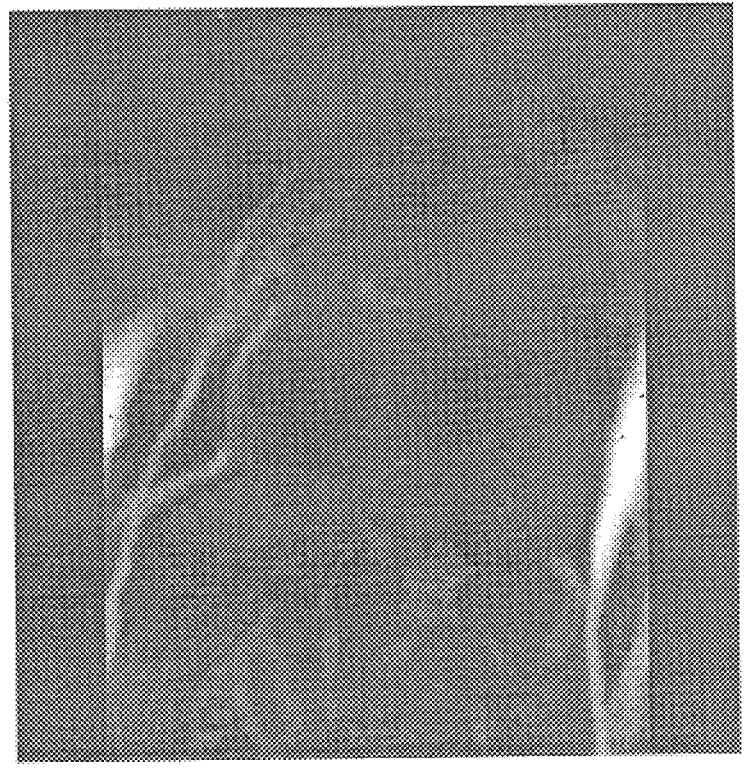
Figure 4C:
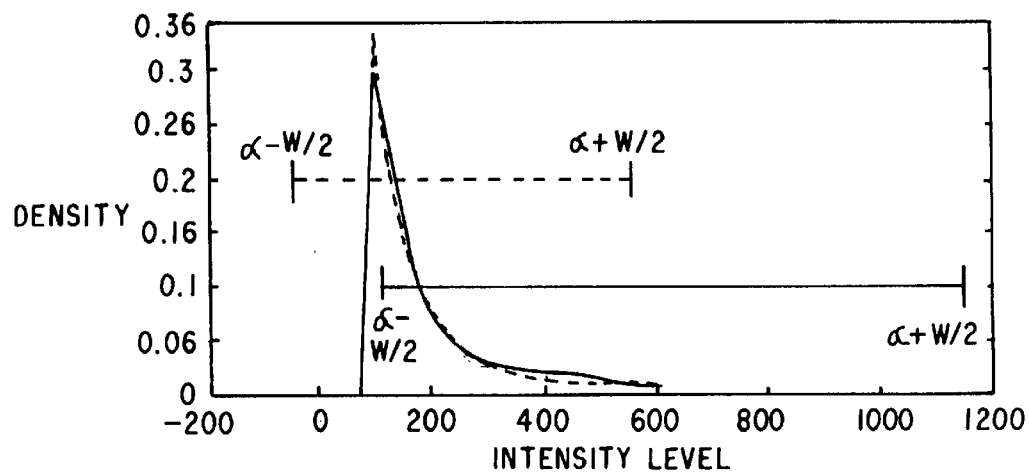
Figure 4D:
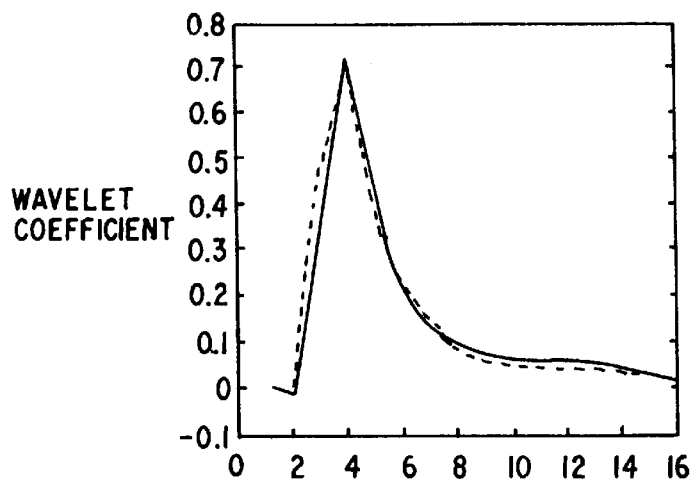
Figure 4E:
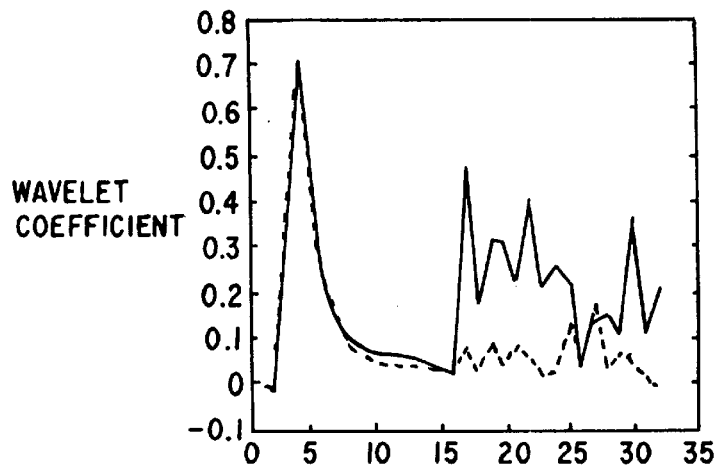

The following will describe spatial statistical features. It is very difficult to achieve satisfactory window width and center adjustment capability similar to human experts purely based on the histogram information. This is because human experts adjust window width and center partially based on the types of MR images as well as the regions of interest in the images, which can not be recovered from the histogram information. This can be justified by the observation that sometimes two different images with very similar histograms can have very different window width and center values adjusted by human experts. FIG. 4 depicts an example of two different MR images with very similar histograms but very different window width/center settings. The two completely different MR images are shown in FIG. 4(a) and FIG. 4(b) with very similar histograms but very different window width/center settings shown in FIG. 4(c). Their wavelet histogram feature vectors are still very similar as shown in FIG. 4(d). With the inclusion of the spatial statistical features, the complete feature vectors become much more distinct as shown in FIG. 4(e). By including the spatial statistical features into the complete feature vector, this ambiguity problem due to only using insufficient histogram information can be resolved. Therefore, the spatial statistical features are also used in addition to the above histogram features as the complete feature vector to be fed into the neural networks.

For the spatial statistical features, the whole image is first partitioned into 4-by-4 blocks. Then the mean and standard deviation of each individual block is used to form the spatial statistical features. In the present invention, the values for each block in the central 2-by-2 region and the average values for the upper two, lower two, left two and right two blocks, are used respectively. This arrangement is illustrated in FIG. 5. In FIG. 5, the means and standard deviations in the marked block regions are combined to be the spatial statistical features.

To be more specific about the arrangement of the spatial statistical features, the details are described as follows. Let the mean and variance in the (i,j)-th block be denoted by $m_{ij}$ and $\sigma_{ij}$, respectively. The statistical features in the central 2-by-2 blocks consist of the components $m_{22}$, $\sigma_{22}$, $m_{23}$, $\sigma_{23}$, $m_{32}$, $\sigma_{32}$, $m_{33}$, and $\sigma_{33}$. For the outer blocks, there are the following linear combinations of block means and block standard deviations $m_{12}+m_{13}$, $\sigma_{12}+\sigma_{13}$, $m_{21}+M_{31}$, $\sigma_{21}+\sigma_{31}$, $m_{24}+m_{34}$, $\sigma_{24}+\sigma_{34}$, $m_{42}+m_{43}$, and $\sigma_{42}+\sigma_{43}$ as the statistical features. The concatenation of all the above features in the central 2-by-2 blocks as well as the outer blocks constitute the spatial statistical features.

The feature vector which is the input to the neural networks is chosen to be the concatenation of the wavelet or KL histogram features discussed above and the spatial statistical features. This combined feature vector is denoted by v.

By including the spatial statistical features into the whole feature vector, the window width/center estimation via the neural network training is greatly simplified. Furthermore, it also improves the robustness of the present invention. To illustrate these claims, a cross talk map is introduced for determining the discrimination power of the features for estimation (function approximation). The cross talk map indicates the degree of complexity for the function to be approximated. A cross talk measure C is defined between two normalized feature vectors u and v with window center and width values given by $(c_u, w_u)$ and $(c_v, w_v)$, respectively, as follows:

$$C(u,c_u,w_u;v,c_v,w_v)=(\min(\|((c_u-c_v)/c_u, (w_u-w_v)/w_u)\|, \|((c_u-c_v)/c_v, (w_u-w_v)/w_v)\|))/(\|u-v\|)$$

The symbol ‖‖ stands for the Euclidean distance. The feature vectors and the window width and center values have to be appropriately normalized in the above definition, i.e. the same as the input and output of the function approximation neural networks. Note that a relative difference minimum norm is used for the difference between the window width and center settings in the numerator of the cross talk measure definition. This norm is designed especially for the window width and center adjustment problem. When the cross talk measure $C(u,c_u,w_u;v,c_v,w_v)$ is large, it means that the two feature vectors are similar but that their window width and center settings are very different, thus making the window width/center adjustment function to be approximated complicated. Therefore, it would be desirable to choose the features such that the entire cross talk measures are as small as possible.

Figure 6A:
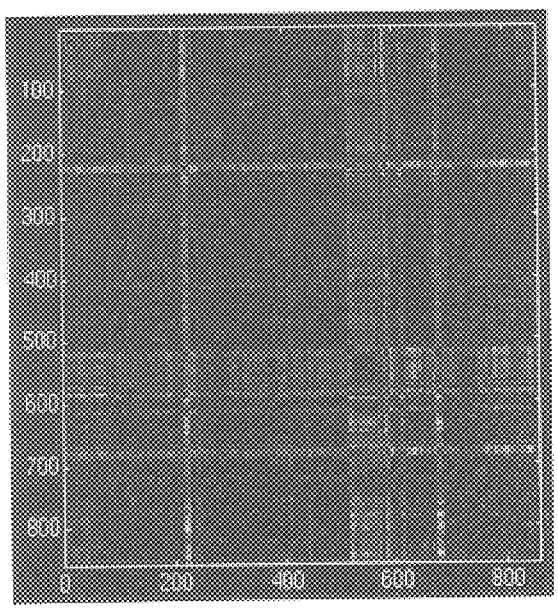
FIG. 6 illustrates cross talk maps for more than eight hundred diverse MR images computed with FIG. 6(a) showing wavelet histogram features only and FIG. 6(b) showing wavelet histogram features and the spatial statistical features.
Figure 6B:
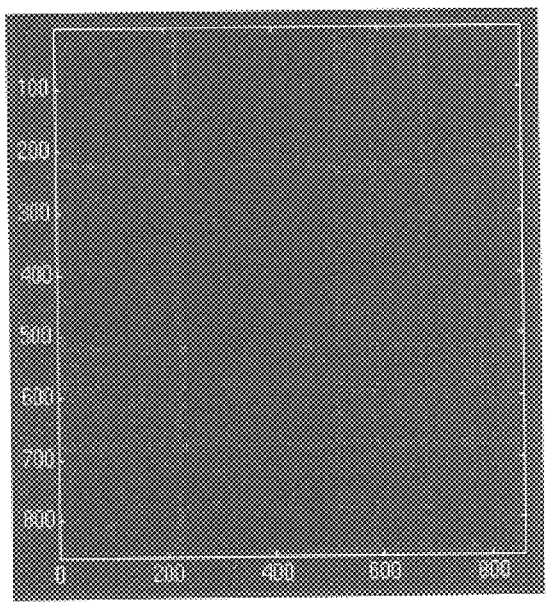

FIG. 6 illustrates the cross talk maps for more than eight hundred diverse MR images with the wavelet histogram features only as shown in FIG. 6(a) as well as with the wavelet histogram features plus the spatial statistical features shown in FIG. 6(b). Comparing these two cross talk maps, it can clearly be seen that the inclusion of spatial statistical features significantly reduces the cross talk measures, thus making the function approximation problem easier for the neural network solution. In addition, it also improves the robustness of the present invention since the complexity of the function to be approximated is reduced with the addition of the spatial statistical features.

The present invention includes new hierarchical neural networks (13 of FIG. 1) for window width and center estimation. The hierarchical neural networks contain a classifier (clustering network) and estimation networks. The clustering network is used to classify the input feature vector into multiple classes which are most closest to it, instead of just one class. This concept is similar to the "soft" splits of data used in the hierarchical mixtures of experts M. I. Jordan and R. A. Jacobs, in "Hierarchical Mixtures Of Experts And The EM Algorithm", MIT A.I. Memo, No. 1440, 1993. In the clustering network of the present invention, the competitive network is employed with the modification that a fixed number of closest classes are chosen, instead of just one. For each class, estimation networks are associated to produce the window width and center estimation. Two types of estimation networks are employed here. One is the RBF (radial basis function) network and the other is the bi-modal linear network. The details of the aforementioned networks are described below.

Figure 7:
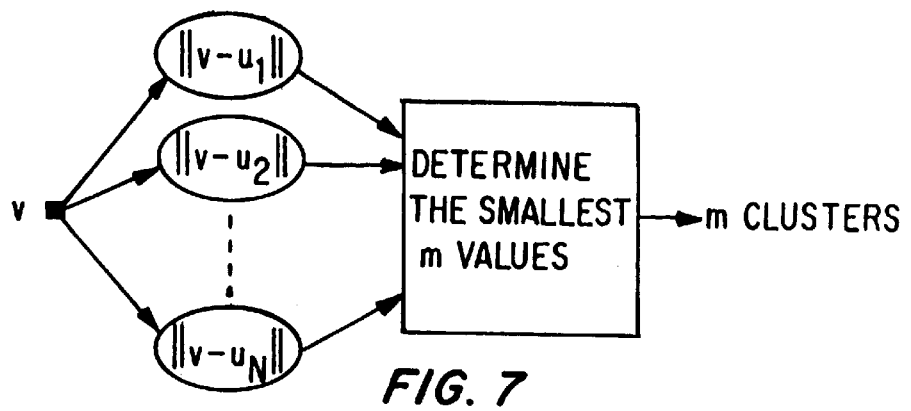
FIG. 7 illustrates the structure of a modified competitive layer network for clustering.

The following will describe clustering networks. The competitive layer network has been modified to classify the input vector v into multiple clusters instead of just one single cluster. There are totally N clusters in the competitive layer network, where N is empirically set to be 90 in the implementation of the present invention. Each cluster is represented by a centroid $u_i$, where i is the cluster index. After the clustering, the input vector is assigned to m clusters which are closest to it, where m is chosen to be 8 in the implementation of the present invention. This can be accomplished by computing the distances between the input feature vector and all the centroids. Then the m clusters with the shortest distances to the input vector are the results of the clustering. The structure of the modified competitive layer network for clustering is shown in FIG. 7. The symbol ‖‖ in the figure stands for the Euclidean norm.

The following will describe estimation networks. After the input feature vector is classified into m clusters after the clustering network, it is fed into the corresponding estimation networks, which consist of RBF networks and bi-modal linear networks. The inclusion of the pre-clustering process has the advantage of reducing the complexity of the problem, i.e. it can divide a very complex function approximation problem in a big space to a number of simpler function approximation problems in smaller spaces. Each simpler function approximation problem is tackled by the RBF network as well as by the bi-modal linear network separately. A brief description of these networks is given below.

The input vector to the radial basis function (RBF) networks is the same as the input vector to the competitive layer clustering network, i.e. the feature vector v discussed above. The outputs are the estimated window width $\hat{w}_i$ and center $\hat{c}_i$, where the subscript i denotes the index of the RBF network. The structure for an individual RBF network for function approximation is shown in FIG. 8.

Figure 8:
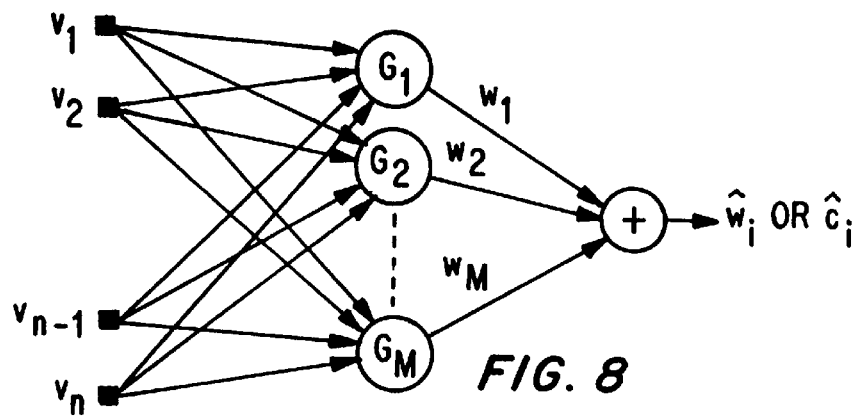
FIG. 8 illustrates the structure of a RBF network for function approximation.

The RBF network has one hidden layer, which consists of M nodes in FIG. 8. Each node is represented by a centroid $x_j$, where the subscript j denotes index of the node. The input to each node is the feature vector v. The output of each node is a radial basis function of the distance between the input feature vector and the associated centroid, i.e. $G(v;x_j)$. Here the multivariate Gaussian function is used as the radial basis function, therefore $$G(v;x_j)=e^{-\|v-x_j\|}$$

where the symbol ‖‖ stands for the Euclidean norm. According to FIG. 8, the window width or center estimate from the RBF network has the following form $$\sum_{j=1}^{M} W_j e^{-\|v-x_j\|}$$

The contribution of each node to the estimate is given by the weight $W_j$. The centroids and the weights are obtained through the RBF network training from a large image data set with the associated window width and center values adjusted by human experts. The total number of nodes used in each RBF network depends on the complexity of the training data points classified into this cluster. This is usually determined during the training process.

The basic idea behind the use of the bi-modal linear networks here is the observation that the distribution of the ratios between the window width or center values adjusted by human experts and the corresponding window width or center reference values discussed above in each cluster can be roughly approximated by a mixture of two Gaussian functions. The bi-modal linear networks for each cluster are designed to produce two window width or center estimates corresponding to the means of the two Gaussian distributions. One of these two estimates is a robust indicator to the goodness of the estimates obtained by the RBF networks. The outputs of the bi-modal linear networks will be used to define confidence measures for the estimates from the RBF networks and then these estimates will be combined based on the associated confidence measures to obtain the final window width and center estimates. The following will describe the structure of the bi-modal linear network for each cluster.

Figure 9A:
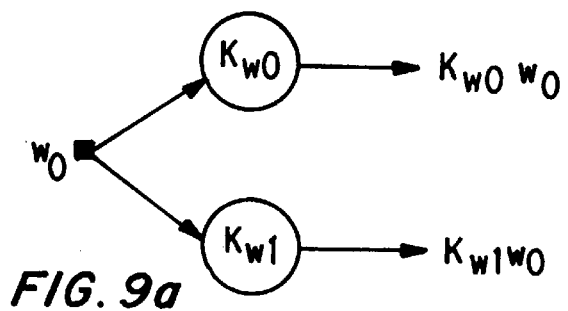
FIG. 9 illustrates the structure of the width bimodal linear network in FIG. 9(a) and the center bimodal linear network in FIG. 9(b).
Figure 9B:
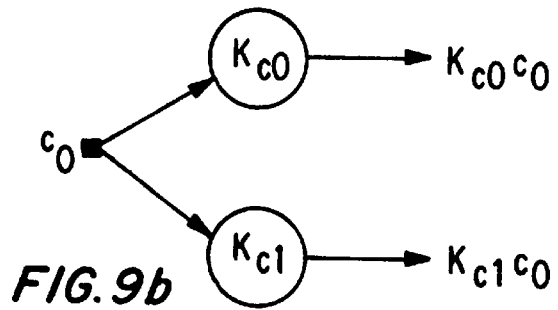
Figure 11A:
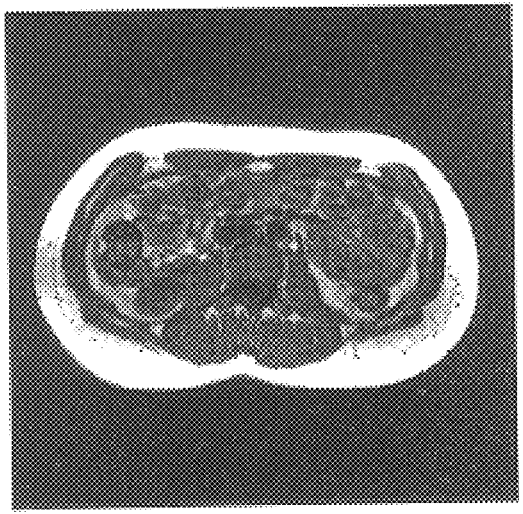
FIG. 11 illustrates through experimental results, the MR images with the largest errors in the window width/center estimation from the neural network system of the present invention.
Figure 11B:
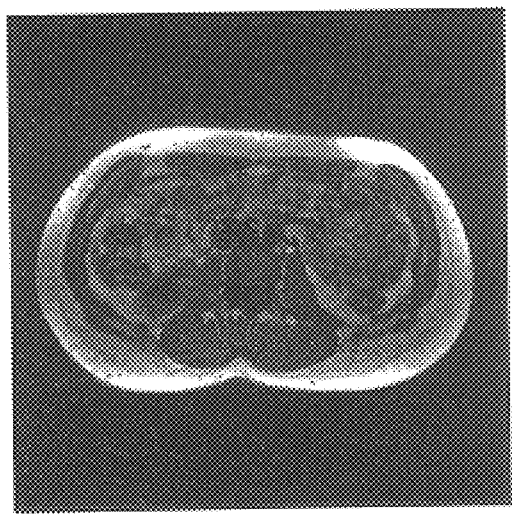
Figure 11C:
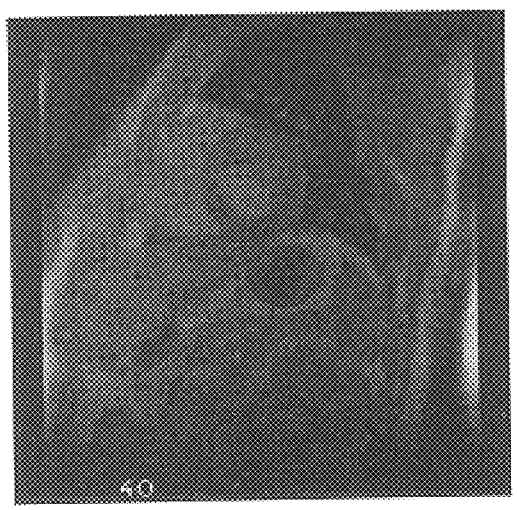
Figure 11D:
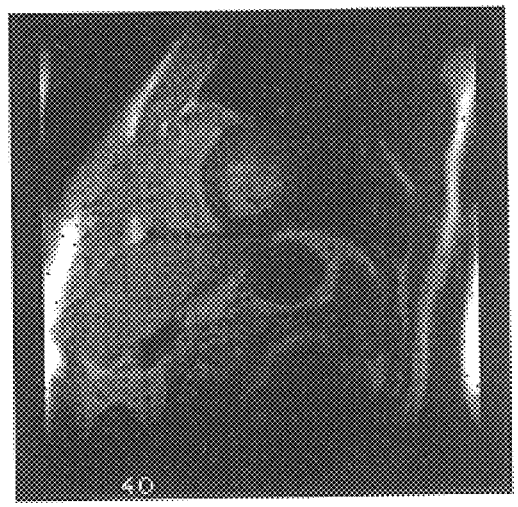
Figure 11E:
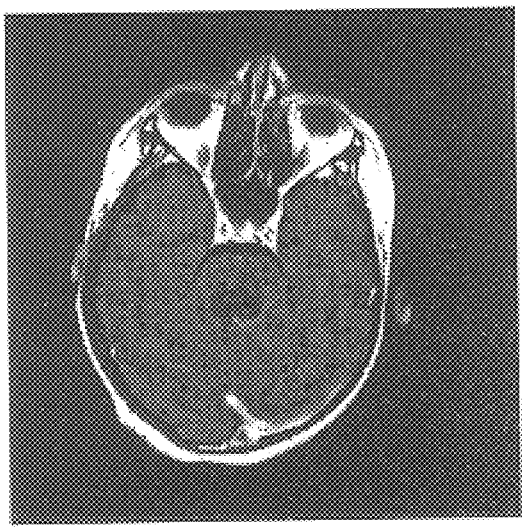
Figure 11F:
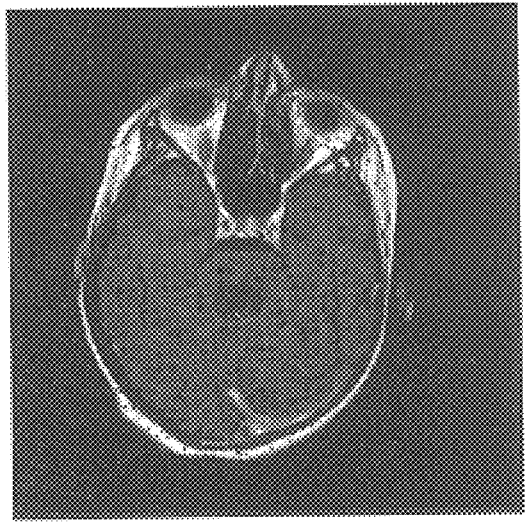
Figure 11G:
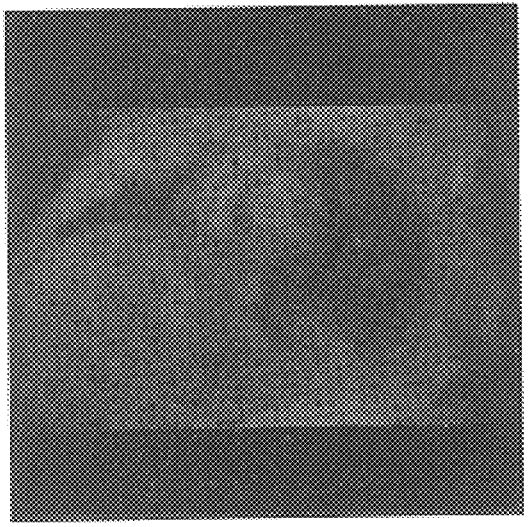
Figure 11H:
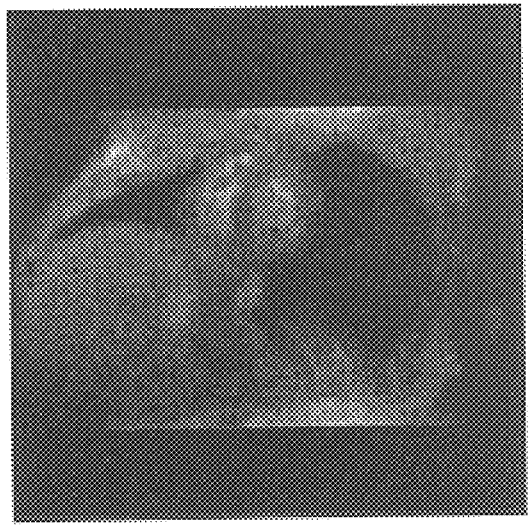
Figure 11I:
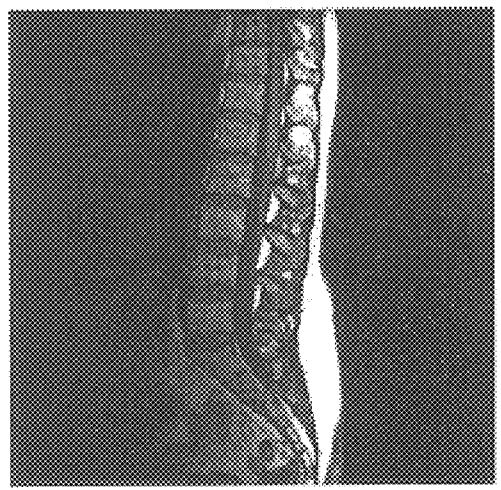
Figure 11J:
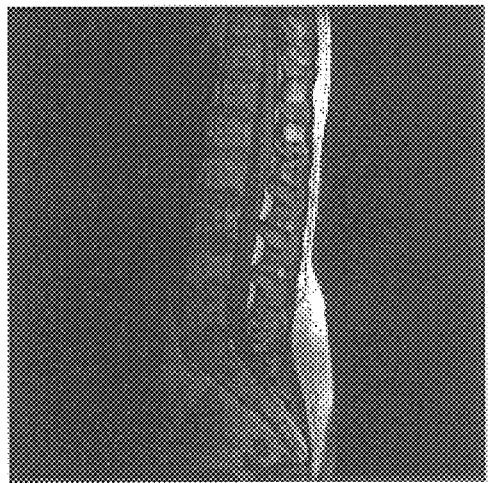
Figure 11K:
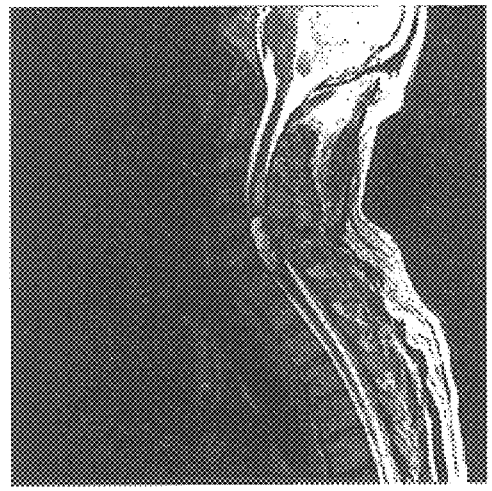
Figure 11L:
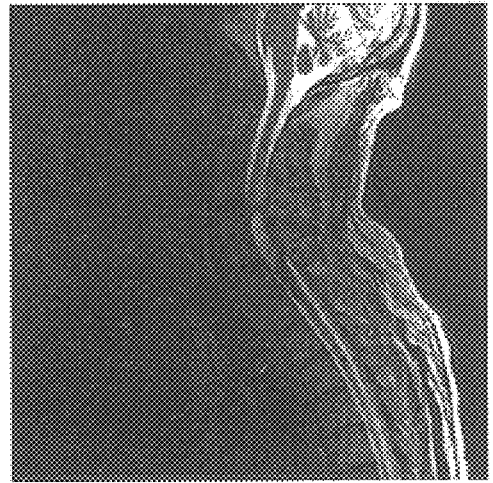
Figure 11M:
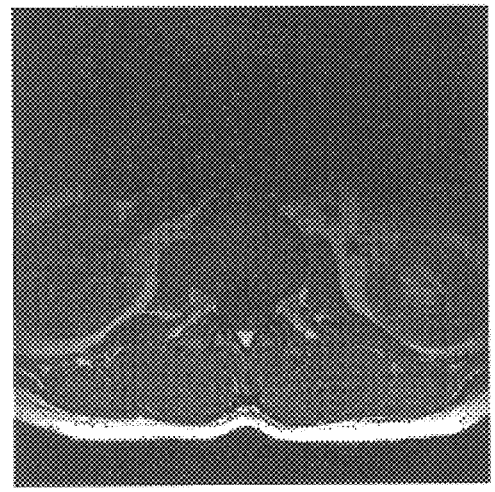
Figure 11N:

As shown in FIG. 9, there are width and center bi-modal linear networks for each cluster of images after the aforementioned clustering process. FIG. 9(a) shows the structure of the width and FIG. 9(b) shows the structure of the center bi-modal linear networks. For each bi-modal linear network, the input is the window width or center reference value. The network generates two outputs which are the scaled values of the input. The weights, i.e. the scaling factors, required in the networks are obtained via training, which will be discussed later.

The following will describe the fusion system of the present invention that is used to intelligently combine the estimates obtained from the RBF networks and the bi-modal linear networks. In the hierarchical neural networks, one image is classified to multiple clusters and there are window width and center estimates from the corresponding RBF networks and bi-modal linear networks for each cluster. Although the input features and the network structures of the RBF network and bi-modal linear network are quite different, the same image data set and the same clustering results are used to train these networks. The window width and center estimates for a new image produced by these two different networks should be consistent with each other if the input image is similar to one of the images in the training data set.

The philosophy of fusing all different estimates to obtain the final window width and center estimate is to take the weighted average of the estimates from the RBF networks with each weight determined by the degree of consistency between the estimate from the RBF network and the corresponding estimate from the bi-modal network for the same cluster. This is because the RBF network can give more accurate estimation when the input image is correctly classified into the cluster, while the estimates produced by the bi-modal linear network are more rough but more robust. Therefore, the estimates from the bi-modal linear networks are used as the reference values for the RBF network estimation.

The consistency between the estimates from the two different networks for the same cluster indicates how well the input image falls into this cluster. Thus a consistency measure based on the relative distance between the estimates from these two different networks can be defined the estimates from the RBF networks of the chosen clusters can be combined with the weighting given by the consistency measure. The details are given below. Let the window width and center estimates from the i-th RBF networks be denoted by $\hat{w}_i$ and $\hat{c}_i$, respectively. The two estimates for the i-th width (center) bi-modal linear network are given by $K_{w0}^{(i)} W_0$ and $K_{w1}^{(i)} W_0 (K_{c0}^{(i)} C_0$ and $K_{c1}^{(i)} C_0)$, respectively. Then the consistency measures $M_w^{(i)}$ and $M_c^{(i)}$ for the above width and center estimates in the i-th cluster respectively are defined in FIG. 10 where $\delta$ is a constant number close to 1. In these consistency measures, the smaller value of the cosine function of the relative errors between the RBF network estimate and each of the two linear network estimates is taken and the measure is set to zero when the both relative errors are greater than a threshold $\delta$, which is chosen to be 0.9 in the present implementation. This thresholding procedure simply means that the RBF network estimate in this cluster is totally inconsistent with the estimates from the bi-modal linear network when both of the relative errors are greater than the threshold, thus these estimates will not be used in the final fusion of the estimates from different clusters. The above definition is based on the observation that the distribution of window width/center values adjusted by human experts for a large set of various images can be well approximated by a mixture of two Gaussian functions. Therefore, each estimate from the RBF network should be close to either one of the centers of the corresponding two Gaussian functions for each cluster when the input image is appropriately classified into this cluster. The cosine function is chosen in the definition of the consistency measure since it is non-negative, symmetric around zero and decreases smoothly away from zero to $\pm\pi/2$. However, an appropriate exponential function, such as a Gaussian function, can also be used to achieve similar purposes.

The fusion of the estimates from RBF networks using the above consistency measures as the weighting leads to the final window width and center estimates, denoted by $\hat{w}$ and $\hat{c}$, as follows:

$$\hat{w} = \left[\sum_{i=1}^{m} M_w^{(i)} \hat{w}_i\right] \bigg/ \left[\sum_{i=1}^{m} M_w^{(i)}\right]$$

$$\hat{c} = \left[\sum_{i=1}^{m} M_c^{(i)} \hat{c}_i\right] \bigg/ \left[\sum_{i=1}^{m} M_c^{(i)}\right]$$

Note that the index i in the above equations stands for the index for the m clusters that the input image is classified to using the aforementioned competitive layer clustering networks. In the above weighted averaging fusion, the estimates with larger consistency measure values contribute more to the final estimation, while the estimates with smaller consistency measure values contribute less to the fusion. The estimates with zero consistency measure are completely ignored in the solution fusion because the corresponding weights are zeros.

The following will describe network training. The hierarchical neural networks consist of the competitive layer clustering networks, RBF estimation networks and bi-modal linear estimation networks. The training of these networks require a large set of various MR images with the window width and center values adjusted by the human experts to be the training data. The feature vectors are extracted from the MR images to be the input vectors to the neural networks, and the window width and center values are normalized to be the anticipated outputs for the estimation networks. The training for these different networks used in the present implementation are basically accomplished by standard training algorithms in neural networks.

The competitive layer clustering networks is trained via an unsupervised Kohonen learning rule. Since it is an unsupervised training, it is only necessary to use the input feature vectors for the training. After the training, N vectors $u_1, u_2, u_3, \ldots, u_N$, are obtained which are the centers of the clusters. For a new input MR image, the m clusters whose centers are closest to its feature vector are found to be the clustering results. Note that the training of the clustering networks has to be completed before the training of the estimation networks for each cluster.

For the training of the RBF and bi-modal linear estimation networks, not only are the computed input feature vectors needed but also the normalized window width and center values as the anticipated outputs of the networks. In addition, the training of these estimation networks requires clustering results. For the RBF networks in each cluster, the training algorithm is to minimize the maximum of the relative errors between the anticipated output and the network output by incrementally adding nodes into the networks. The training of the bi-modal linear networks is based on roughly classifying the data into two groups for each cluster, then the weight for each group can be easily computed by averaging the ratios of the anticipated outputs to the corresponding inputs.

In one implementation of the present invention, more than two thousand and four hundred MR images of various types and studies with their window width and center values adjusted by human experts for the training of the neural networks have been used. For the testing of the present invention, four hundred and sixty various MR images of diverse types were used as the testing data set and the corresponding window width and center values adjusted by human experts were taken as the ground truth values. Note that the testing MR images along with their window width and center settings could be very different from those in the training data set center when the testing and training data sets are the same.

According to these experiments, the performance of the hierarchical neural network of the present invention using the wavelet histogram features is similar to that using the KL histogram features. The experimental results reported here are obtained by using the wavelet histogram features. In the present implementation, the total number of clusters N is empirically set to 90, and the total number of assigned clusters for each input image m is chosen to be 8.

The present invention provides very accurate estimation for the window width and center when the testing and training data sets are the same. In principle, the training of estimation networks is the same as function fitting to the training data. Perfect fitting to the training data can be achieved by increasing the total number of clusters in the hierarchical networks or the nodes in the RBF networks. However, it may fall into the over-training (or over-fitting) problem and degrade the generalization power of the networks. Note that the generalization of neural networks is the ability to give reasonable outputs, i.e. window width/center estimates, which are close to the target values (human adjusted values) for MR images not in the training data set. In most cases including the window width/center estimation problem, there is more interest in the generalization power of the networks. Therefore, a testing data set containing 460 diverse MR images, which are totally different from the images in the training data set, is used for testing the generalization power of the networks.

As discussed above, perfect training results can be achieved by increasing the total number of clusters in the hierarchical networks or the nodes in the RBF networks. However, it may fall into the over-training problem, thus reducing its generalization power. To avoid this over-training problem, a compromised setting that can train the networks reasonably well but still provide good generalization capability to the networks is chosen. Table 1 depicts the training results of the networks for the percentages of the width and center estimates of the training data set with the relative error below 15%, 20%, 25%, 30%, 35%, 40%, 45% and 50%. The average relative errors are 7.06% for the width estimation and 6.97% for the center estimation. The average absolute errors are 45.7 and 76.4 for the center and width estimates, respectively. Note that the relative error is more useful than the absolute error in the accuracy assessment of the window width/center adjustment problem, since the ranges of the intensity values (or window width/center values) for MR images can be very different from images to images. The absolute error is just given for reference. These trained networks will be used to test the 460 diverse MR images in the testing data set, which is exclusive from the training data set. The human adjusted window width and center values for these images are used as the ground truth for assessing the accuracy of the hierarchical neural network estimation.

Table 1 below is a summary of the training results on a wide range of 2436 MR images for the hierarchical neural network method. Note that the training results can be further improved by increasing the total number of clusters in the hierarchical networks or the nodes in the RBF networks, which may lead to the over-training problem. Therefore, a comprised setting for the training to avoid the over-training problem and provide good generalization capability has been chosen.

| Error Bound | Percentage of Width Estimates | Percentage of Center Estimates |
|---|---|---|
| 15% | 89.29% | 88.38% |
| 20% | 93.86% | 93.97% |
| 25% | 96.37% | 97.21% |
| 30% | 97.95% | 98.52% |
| 35% | 98.56% | 99.22% |
| 40% | 98.93% | 99.59% |
| 45% | 99.18% | 99.63% |
| 50% | 99.26% | 99.71% |

Table 2 below is a summary of the results of the experiment on the testing data set containing 460 diverse MR images, which are completely different from those in the training data set, by using the hierarchical neural network method.

| Error Bound | Percentage of Width Estimates | Percentage of Center Estimates |
| --- | --- | --- |
| 15% | 48.04% | 64.35% |
| 20% | 63.48% | 78.59% |
| 25% | 78.04% | 83.91% |
| 30% | 84.13% | 88.04% |
| 35% | 89.78% | 92.61% |
| 40% | 93.26% | 94.57% |
| 45% | 95.00% | 96.09% |
| 50% | 96.74% | 96.74% |

The generalization power of the hierarchical neural networks (with the training results given in Table 1) is tested on a totally different data set containing 460 diverse MR images. The human adjusted window width and center values for these images are used as the ground truth for assessing the accuracy of the hierarchical neural network estimation. The results of applying the present invention on this testing data set are reported in Table 2. The average relative errors for the center and width estimates are 15.07% and 18.01%, respectively. The absolute errors for the center and width estimates are 90.8 and 218.9, respectively. In general, there is no significant difference between the image displayed with the window width and center values adjusted by human experts and by the neural network method when the relative errors are within 20%–30%. Based on Table 2, it can be concluded that the hierarchical neural network system of the present invention can give satisfactory window width and center estimation for approximately 85% diverse MR images that have not been trained to the networks.

Since there are almost no noticeable differences between the displays of the images using the display window parameters provided by the present invention and by human experts when the estimation errors are within 20%–30%, some MR images with the largest estimation errors from the hierarchical neural network system can be depicted to show the robustness of the present invention in FIG. 11. These MR images are shown with the window width and center values adjusted by human experts and by the neural network system of the present invention. For these images, the present invention gives more than 50% errors either in window width or center estimates. Note that the present invention fails to provide the window width/center estimates within 50% errors for only less than 5% of the images in the testing data set. The displays of the images with the worst estimation results depicted in FIG. 11 show that the estimates provided by the present invention with largest relative deviations from the settings by human experts are still reasonable, although they may not be the optimal settings for each individual.

From the experimental results, it can be seen that the most unsatisfactory estimation occurs in the surface coil images with serious intensity inhomogeneity. There seems to be a different way to adjust the window width and center for these images. Since the surface coil images have in general much larger dynamic ranges, a global optimum setting of windowing parameters which displays the whole image clearly may not exist. A human operator is therefore forced to select suitable width and center parameters which can display only the regions of interest optimally while scarifying the rest of the image (e.g. over-saturation in some bright regions). In this case, a human operator is actually using high-level knowledge such as the anatomical structure and the purpose of the examination, to decide which regions in the image should be displayed clearly so that a physician can get the maximum diagnostic information from the image. Unfortunately, this high-level knowledge also relates to personal preference and it could vary greatly from person to person. This could lead to very different window width and center adjustment for the same MR image by different human experts. It is very possible the display window parameter settings for the training data set and testing data set are not very consistent, since they were adjusted by different human experts at different time and at different conditions. Therefore, the window width/center estimation obtained from the neural networks occasionally lead to large deviations for some images possibly due to the fact that their display window parameters were adjusted by different human experts with different tastes, in different environmental conditions, or on different display monitors. Therefore, the on-line training capability will be necessary to adapt the window width and center estimation to personal preference, different environmental conditions and different settings of display monitors.

FIG. 11 illustrates the MR images with the largest errors in the window width/center estimation from the neural network system of the present invention. These images are shown with the window width and center values adjusted by human experts and by the neural network system shown in the left and right columns, respectively. For these images among the worst estimation results, the displays with the window width/center values provided by the system are still reasonable as shown in the figure, although they may not be the optimal settings. The relative differences between the above two settings for the pairs (a)–(b), (c)–(d), (e)–(f), (g)–(h), (i)–(j), (k)–(l) and (m)–(n) are 55%(center) and 57%(width), 31%(center) and 50%(width), 39%(center) and 69%(width), 32%(center) and 52%(width), 74%(center) and 85%(width), 59%(center) and 69%(width), 58%(center) and 63%(width), respectively.

The present invention is a robust and accurate display window width/center estimation system for MR images based on hierarchical neural networks. The wavelet histogram features and the spatial statistical features are extracted from the images and used as the input feature vector to the neural networks. The hierarchical neural networks of the present invention consist of a competitive layer neural network for clustering, 180 RBF networks and 180 bi-modal linear networks for estimation. The clustering network classifies an image into multiple clusters. Then the estimates from the associated estimation networks of these clusters are combined to provide the final estimation. The fusion of these estimates is accomplished by weighted averaging with the weight determined by consistency measure between the two estimates from the RBF network and bi-modal network in the same cluster. In experiments, the hierarchical neural network of the present invention was trained using a training data set containing more than 2400 MR images. After the training, the system was tested on 460 diverse MR images which are completely exclusive from those in the training data set. The testing results show that the system can provide window width/center estimation within 20%–30% errors for approximately 85% of all the testing images. In most cases, there is no significant differences in the image display with the display window parameter settings within 20%–30% relative differences. The window width/center estimation using the hierarchical neural network system occasionally lead to large deviations for some images that require high-level knowledge, such as anatomical structure or purpose of examination, to adjust the display window to display only the regions of interest optimally while scarifying the rest of the image. In addition, the display window setting of these images may be strongly dependent on personal preference and environmental conditions. Therefore, the on-line training capability will be necessary to adapt the window width and center estimation to personal preference and different environmental conditions.

It is not intended that this invention be limited to the hardware or software arrangement, or operational procedures shown disclosed. This invention includes all of the alterations and variations thereto as encompassed within the scope of the claims as follows.

We claim:

1. A system for the automatic adjustment of display window width and center for MR images comprising:

a feature generator for receiving an input MR image;

hierarchical neural networks having a classifier connected to said feature generator for clustering said input MR image into a plurality of subclasses and a bi-modal linear estimator for each of said subclasses, said hierarchical neural networks provide window width and center estimates; and data fusion connected to said hierarchical neural networks for combining said window width and center estimates for providing final display parameters.

2. A system for the automatic adjustment of display window width and center for MR images as claimed in claim 1 wherein said feature generator comprises:

compute and subsample histograms for receiving said input MR image and for providing a subsampled histogram;

range of interest connected to said compute and subsample histograms for receiving said subsampled histogram;

re-sample and normalize histogram connected to said range of interest;

wavelet transform connected to said re-sample and normalize histogram;

KL transform connected to said re-sample and normalize histogram;

wavelet histogram features connected to said wavelet transform; and,

KL histogram features connected to said KL transform.

3. A system for the automatic adjustment of display window width and center for MR images as claimed in claim 2 wherein said range of interest comprises:

background thresholding means for finding a background thresholding value from said subsampled histogram, for setting a portion of said subsampled histogram that is below said background thresholding value to zero and for providing a new histogram;

compute means for computing a mean $\mu$ and a standard deviation $\sigma$ of said input MR image from said new histogram; and, range compute means for taking a range of interest as an interval between $\max(\mu-3\sigma,0)$ and $\min(\mu+3\sigma,\text{Imax})$.

4. A system for the automatic adjustment of display window width and center for MR images as claimed in claim 2 wherein:

said re-sample and normalize histogram smoothes and re-samples a histogram by using a pre-determined number of bins.

5. A system for the automatic adjustment of display window width and center for MR images as claimed in claim 2 wherein said wavelet transform and said KL transform comprise:

compression means for compressing histograms of said input MR image to a smaller size of a feature vector so that said clustering neural network can execute and train.

6. A system for the automatic adjustment of display window width and center for MR images as claimed in claim 1 wherein said feature generator comprises:

histogram means; and, spatial intensity distribution means;

wherein said histogram means and said spatial intensity distribution means resolve conflicting situations where window display settings are different although histograms of said MR images are similar.

7. A system for the automatic adjustment of display window width and center for MR images as claimed in claim 1 wherein said hierarchical neural networks further comprise a radial bases function estimator for each of said different subclasses connected to said classifier.

8. A system for the automatic adjustment of display window width and center for MR images as claimed in claim 7 wherein:

said classifier is competitive layer neural network based.

9. A system for the automatic adjustment of display window width and center for MR images as claimed in claim 7 wherein said bi-modal linear estimator and said radial bases function estimator comprise:

training means for making said bi-modal linear estimator and said radial bases function estimator adaptable to new kinds of MR images simply by training said bi-modal linear estimator and said radial bases function estimator with said new kinds of MR images.

10. A system for the automatic adjustment of display window width and center for MR images as claimed in claim 7 wherein said bi-modal linear estimator comprises:

robust and reasonable estimation means for providing an estimate for a wide range of images that may not be included in a training data set.

11. A system for the automatic adjustment of display window width and center for MR images as claimed in claim 7 wherein said radial bases function estimator comprises:

accurate estimation means for providing an estimate for known (trained) MR image types.

12. A system for the automatic adjustment of display window width and center for MR images as claimed in claim 7 wherein:

said data fusion uses estimates from each of said bi-modal linear estimators and each of said radial bases function estimators for providing final display parameters.

13. A method for automatically adjusting display window width and center for MR images comprising the steps of:

utilizing a feature generator to receive an input MR image;

clustering said input MR image into different subclasses with a clustering neural network;

estimating each of said different subclasses with a bi-modal linear estimator;

estimating each of said different subclasses with a radial bases function estimator;

providing window width and center estimates from said clustering and estimating steps; and fusing data including said window width and center estimates from said bi-modal linear estimator and said radial bases function estimator to provide final display parameters.

14. A method for automatically adjusting display window width and center for MR images as claimed in claim 13 wherein utilizing a feature generator comprises the steps of:

computing a histogram from said input MR image;

subsampling said histogram;

determining a range of interest;

re-sampling a new histogram normalizing said new histogram;

performing a wavelet transform;

performing a KL transform;

providing wavelet histogram features; and, providing KL histogram features.

15. A method for automatically adjusting display window width and center for MR images as claimed in claim 14 wherein determining a range of interest comprises the steps of:

finding a background thresholding value from a subsampled histogram;

setting a portion of said subsampled histogram that is below said background thresholding value to zero;

providing a new histogram;

computing a mean $\mu$ and a standard deviation $\sigma$ of said input MR image from said new histogram; and, taking a range of interest as an interval between max($\mu$−3$\sigma$,0) and min($\mu$+3$\sigma$,Imax).

16. A method for automatically adjusting display window width and center for MR images as claimed in claim 14 wherein performing a wavelet transform and performing a KL transform comprises the step of:

compressing histograms of said input MR image to a smaller size of a feature vector so that said clustering neural network can execute and train efficiently.

17. A method for automatically adjusting display window width and center for MR images as claimed in claim 13 wherein utilizing a feature generator comprises the steps of:

deriving a histogram; and, performing spatial intensity distribution;

wherein deriving a histogram and performing spatial intensity distribution resolves conflicting situations where window display settings are different although histograms of said MR images are similar.

18. A method for automatically adjusting display window width and center for MR images as claimed in claim 13 wherein estimating each of said different subclasses with a bi-modal linear estimator and estimating each of said different subclasses with a radial bases function estimator comprises the step of:

making said bi-modal linear estimator and said radial bases function estimator adaptable to new kinds of MR images simply by training said bi-modal linear estimator and said radial bases function estimator with said new kinds of MR images.

19. A method for automatically adjusting display window width and center for MR images as claimed in claim 13 wherein estimating each of said different subclasses with a bi-modal linear estimator comprises the step of:

providing a robust and reasonable estimate for a wide range of images that may not be included in a training data set.

20. A method for automatically adjusting display window width and center for MR images as claimed in claim 13 wherein estimating each of said different subclasses with a radial bases function estimator comprises the step of:

providing an accurate estimate for known MR image types.

21. A method for automatically adjusting display window width and center for MR images as claimed in claim 13 wherein fusing data comprises the steps of:

using estimates from said bi-modal linear estimator; and, using estimates from said radial bases function estimator.

\* \* \* \* \*